United States Patent
Kraft et al.

[11] Patent Number: 6,042,778
[45] Date of Patent: Mar. 28, 2000

[54] SLIDING BEARING AND METHOD OF MAKING A SLIDING BEARING MATERIAL

[75] Inventors: Erik Kraft, Stadtallendorf; Udo Roos, Homberg/Ohm; Hubert Schwarze, Marburg, all of Germany; Thomas Piesch, Bisamberg, Austria

[73] Assignee: Federal-Mogul Deva GmbH, Stadtallendorf, Germany

[21] Appl. No.: 08/989,462

[22] Filed: Dec. 12, 1997

[30] Foreign Application Priority Data

Dec. 14, 1996 [DE] Germany .............................. 196 52 155
Dec. 4, 1997 [DE] Germany .............................. 197 53 639

[51] Int. Cl.[7] ................................. B22F 3/10; B22F 3/26; B22F 7/04
[52] U.S. Cl. ................................. 419/27; 419/2; 419/6; 419/28
[58] Field of Search ................................. 419/2, 6, 27, 28

[56] References Cited

U.S. PATENT DOCUMENTS

| | | |
|---|---|---|
| 3,369,924 | 2/1968 | Duggins et al. |
| 5,091,098 | 2/1992 | Tanaka et al. .......................... 252/12.2 |
| 5,162,157 | 11/1992 | Tanaka et al. .......................... 428/549 |
| 5,354,622 | 10/1994 | Nakamaru et al. ..................... 428/551 |
| 5,433,870 | 7/1995 | Nakamaru et al. ..................... 252/12.4 |
| 5,447,774 | 9/1995 | Tanaka et al. .......................... 428/141 |
| 5,624,887 | 4/1997 | Nakamaru et al. ..................... 508/108 |
| 5,629,082 | 5/1997 | Baureis et al. ......................... 428/306.6 |
| 5,643,683 | 7/1997 | Tanaka et al. .......................... 428/551 |
| 5,665,825 | 9/1997 | Davies et al. .......................... 525/189 |
| 5,803,614 | 9/1998 | Tsuji ...................................... 384/276 |
| 5,875,702 | 3/1999 | Kawagoe et al. ...................... 92/12.2 |

FOREIGN PATENT DOCUMENTS

| | | |
|---|---|---|
| 3516649 | 11/1986 | Germany . |
| 707065 | 4/1954 | United Kingdom . |
| 719312 | 12/1954 | United Kingdom . |
| 754115 | 8/1956 | United Kingdom . |
| 923642 | 4/1963 | United Kingdom . |

*Primary Examiner*—Daniel J. Jenkins
*Attorney, Agent, or Firm*—Venable; Gabor J. Kelemen; Ashley J. Wells

[57] ABSTRACT

A sliding bearing which is multilayered, self-lubricating and maintenance-free includes a metallic supporting body; and a layer of sintered bronze which is provided on the metallic supporting body and which has pores filled with polytetrafluoroethylene (PTFE) to provide a PTFE-impregnated sintered bronze layer, the PTFE being uniformly distributed and serving as a solid lubricant, and the PTFE-impregnated sintered bronze layer having a sliding surface composed of the PTFE particles but no PTFE cover layer. The sliding bearing is made by a method including applying a layer of bronze powder onto the metallic supporting body, the bronze powder having different particle sizes, having a mean particle size of about 40 μm, and having a particle shape which is dendritic; sintering the layer of bronze powder in a furnace at a temperature of about 800° C. to provide a sintered assembly; hot rolling the sintered assembly to provide the bronze layer with a porosity ranging from 40 to 70% throughout the entire thickness of the bronze layer; placing the sintered assembly in a container under a vacuum; supplying a suspension comprised of PTFE particles to the container for an infiltration period effective to secure infiltration of the PTFE particles into the pores of the sintered layer of bronze and provide a PTFE-impregnated bronze layer having a PTFE content of up to 20 weight %; and densifying the PTFE-impregnated bronze layer by means of rolling.

11 Claims, 1 Drawing Sheet

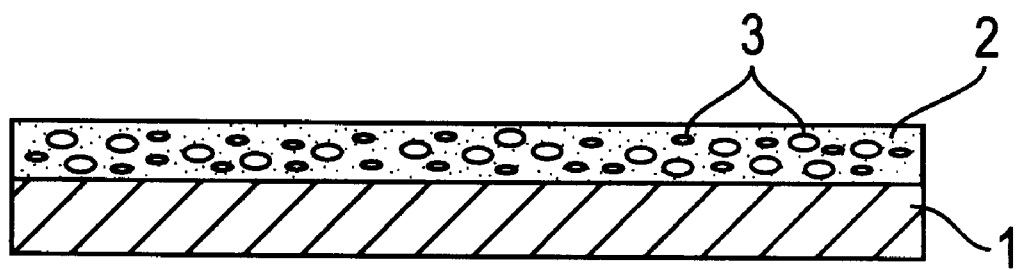
FIGURE

SLIDING BEARING AND METHOD OF MAKING A SLIDING BEARING MATERIAL

CROSS-REFERENCE TO RELATED APPLICATION

This application claims the priority of Application Serial No. 196 52 155.6 filed on Dec. 14, 1996 in Germany and the priority of Application Serial No. 197 53 639.5 filed on Dec. 4, 1997 in Germany the subject matter of both of which is incorporated herein by reference.

BACKGROUND OF THE INVENTION

1. Field of the Invention

This invention relates to a sliding bearing which is multilayered, self-lubricating and maintenance-free, and to a method of making multilayered sliding bearing material. The sliding bearing material according to the invention is comprised of a layer of bronze which is porously sintered onto a metallic supporting body and which has pores which are impregnated with polytetrafluoroethylene (PTFE) by vacuum infiltration.

2. Description of the Related Art

Multilayered sliding bearing materials are widely used in many engineering applications, e.g., machines used in the food and household appliance industries. A high economic efficiency for such machines has been achieved by abandoning complicated lubricating arrangements.

Bearings made from sliding bearing materials are known. Such bearings are comprised of a porous bronze layer sintered onto a steel band and having a sliding layer comprised of PTFE/lead rolled onto the bronze layer in such a way that the sliding layer does not delaminate. Published German Patent Application No. 35 16 649, for example, discloses a self-lubricating bearing. The sliding layer of this bearing is comprised of a mixture of lead oxide and PTFE resin. This sliding layer covers the porous sintered metal layer and fills the pores thereof. This prior art sliding layer projects beyond the sintered the metal layer and has a structure which influences the characteristics of such a bearing. The sliding layer is applied to the sintered metal layer as a paste comprised of PTFE and lead by roller coating.

Published British Patent Application No. 707,065 discloses a vacuum impregnating method for embedding PTFE in the pores of a metallic surface. The surface has a porous layer, but no information is provided with respect to the porosity. Published British Patent Application No. 754,115 discloses a bronze layer having a pore volume of 30%. The pores can be filled by means of any impregnating method. The porosity of the bronze layer is generated by applying a bronze powder having a specific particle size. The porosity formed in this manner is not sufficient for generating a uniform impregnation throughout the entire thickness of the bronze layer, however. At the surface of the bronze layer, the amount of embedded PTFE is greater than in the deeper-lying region.

It is an object of the invention to provide a sliding bearing made of a sliding bearing material which has extremely low friction coefficients and wear rates, and which is also particularly suited for use in the foodstuff industry, particularly for food processing machines.

It is a further object of the invention to provide a sliding bearing material comprising a porous metal layer uniformily impregnated with PTFE so that the PTFE is homogeneously distributed throughout the thickness of the porous metal layer.

SUMMARY OF THE INVENTION

These and other objects are accomplished by the present invention which provides a sliding bearing which is multilayered, self-lubricating and maintenance-free, comprising a metallic supporting body; and a layer of sintered bronze which is provided on the metallic supporting body and which has pores impregnated with polytetrafluoroethylene (PTFE) to provide a PTFE-impregnated sintered bronze layer, the PTFE being uniformly distributed throughout the cross-sectional thickness of the PTFE-impregnated sintered bronze layer and serving as a solid lubricant, and the PTFE-impregnated sintered bronze layer having a sliding surface comprised of PTFE but no PTFE cover layer.

The present invention additionally provides a method of making a multilayered sliding bearing material which is self-lubricating and maintenance-free, the method comprising the steps of (a) applying a layer of bronze powder onto a metallic supporting body, the bronze powder having different particle sizes, having a mean particle size of about 40 $\mu$m, and having a particle shape which is dendritic; (b) sintering the layer of bronze powder onto the metallic supporting body in a furnace at a temperature of about 800° C. to provide a sintered layer of bronze having pores and to provide a sintered assembly; (c) hot rolling the sintered assembly to provide the bronze layer with a porosity ranging from 40 to 70% throughout the entire thickness of the bronze layer; (d) placing the sintered assembly in a container under a vacuum; (e) supplying a suspension comprised of PTFE particles to the container for an infiltration period effective to secure infiltration of the PTFE particles into the pores of the sintered layer of bronze and provide a PTFE-impregnated bronze layer having a PTFE content of up to 20 weight %; and (f) densifying the PTFE-impregnated bronze layer by means of rolling so that the PTFE-impregnated bronze layer has a sliding surface comprised of PTFE but no PTFE cover layer.

The present invention further provides a method of making a multilayered sliding bearing material which is self-lubricating and maintenance-free, the method comprising the steps of (a) applying a layer of bronze powder onto a metallic supporting body, the bronze powder having different particle sizes, having a mean particle size of about 40 micrometers, and having a particle shape which is dendritic; (b) pre-sintering the layer of bronze powder onto the metallic supporting body in a furnace at a temperature of about 800° C. to provide a pre-sintered layer of bronze having pores and to provide a pre-sintered assembly; (c) hot rolling the pre-sintered assembly at a temperature of about 800° C. to provide the bronze layer with a porosity ranging from 40 to 70% throughout the entire thickness of the bronze layer; (d) sintering the bronze layer by heating continuously at a temperature of about 800° C. and by maintaining the temperature for a period of time which is short; (e) placing the sintered assembly in a container under a vacuum; (f) supplying a suspension comprised of PTFE particles to the container for an infiltration period effective to secure infiltration of the PTFE particles into the pores of the sintered layer of bronze and provide an assembly including a PTFE-impregnated bronze layer having a PTFE content of up to 20 weight %; (g) removing the assembly from the container; (h) drying the assembly at a temperature effective therefore; and (i) densifying the PTFE-impregnated bronze layer by means of col;d-rolling so that the PTFE-impregnated bronze layer has a sliding surface compised of PTFE but no PTFE cover layer.

In contrast to prior art sliding bearing materials made by the PTFE roll-on method, the present invention provides a sliding bearing material having a sliding surface comprised of PTFE which does not project beyond the sintered bronze layer so that the sliding surface of the invention is not a coating or cover layer as was known in the prior art. The sliding bearings according to the invention are thus self-lubricating since a fresh lubricating surface is exposed as the bearing wears in use. Moreover, the sliding bearings according to the invention are maintenance-free unlike prior art sliding bearings which have a sliding layer which may delaminate or completely wear away in use and which has a more rapid wear rate than the sliding bearings according to the present invention.

The method according to the present invention produces a precisely defined density or porosity of the bronze layer. The porosity extends substantially uniformly from the outer surface to the metallic supporting body. This advantageously creates the precondition for a homogenous distribution of the embedded PTFE throughout the entire structure of the uniformly porous bronze layer. That is, PTFE is present to the same extent in the proximity of the supporting body as in the region(s) which are close to the surface. The cooperation of the hot-rolling step with the provision of a high temperature of approximately 800° C. creates an open porosity within the sintered bronze layer which is controlled in a defined manner.

The present invention employs a vacuum infiltration technique which advantageously imparts, on the one hand, a homogenous structure to the PTFE-impregnated sintered bronze layer and, on the other hand, improved adhesion of the PTFE material to the sintered bronze. Furthermore, impregnating and preferably filling the pores of the sintered porous layer with PTFE material ensures that PTFE solid lubricant is continuously exposed and released evenly and in sufficient amounts so that good mechanical and physical properties are simultaneously obtained. Advantageously therefore solid lubricants, such as lead and graphite, can be omitted. This ensures, on the one hand, a better vibrational damping compared to sliding bearing materials with additional solid lubricants. On the other hand, this permits use of the sliding bearing material in the foodstuff industry, such as for machines employed in foodstuff processing.

Advantageous features of the invention follow.

The hot rolling advantageously takes place at a temperature of about 800° C. The method advantageously further comprises, after hot rolling, sintering the bronze layer by heating continuously at a temperature of about 800° C. and by maintaining the temperature for a period of time which is short, for example, less than 30 minutes, preferably less than 15 minutes, most preferably less than 5 minutes.

The bronze powder may be comprised of from 80 to 95 weight percent of cooper and from 5 to 20 weight percent of tin. Preferably, the bronze powder is comprised of 87 weight percent of cooper and 13 weight percent of tin. The bronze powder may further comprise at least one of aluminum, zinc, lead and magnesium. The bronze layer advantageously has a thickness which ranges from about 0.5 to about 10 mm. Bronze powder is applied in weights and heights preselected to provide such thicknesses for the bronze layer.

The sintered bronze layer is advantageously impregnated with a suspension of PTFE particles comprised of water and PTFE particles having different particles sizes. Other liquids may be used in place of water. Preferably, the suspension is substantially comprised of water and PTFE particles having different particles sizes. Vacuum infiltration of PTFE into the sintered bronze layer is advantageously performed for an infiltration period effective to impregnate and preferably substantially fill the pores of the porous sintered bronze layer with PTFE particles and provide a substantially uniformly impregnated sintered bronze layer. The infiltration period is advantageously about 15 minutes but is not limited to this. The sintered bronze layer is advantageously impregnated with an amount of PTFE which is effective to provide lubrication of the sliding bearing in use. Preferably the sintered bronze layer is impregnated with up to 20 weight percent of PTFE.

The method advantageously further comprises, after supplying the suspension comprised of PTFE and before densifying, removing the sintered assembly from the container and drying the sintered assembly in a kiln at a temperature ranging from about 40° C. to about 90° C. to remove liquid, such as water, therefrom.

BRIEF DESCRIPTION OF THE DRAWINGS

The sole drawing FIGURE is a cross-sectional view of a multilayered sliding bearing material according to the present invention.

DESCRIPTION OF THE PREFERRED EMBODIMENTS

The multilayered sliding bearing material according to the invention is illustrated in the FIGURE which shows a supporting body 1 on which is provided a sintered layer of bronze 2 impregnated with PTFE particles 3.

Supporting body 1 may be made of, for example, steel or copperplated steel. The multilayered sliding bearing material according to the invention is made by applying a layer of bronze powder onto the supporting body 1. The layer of bronze powder has a precisely defined weight and height. The bronze powder may be a powder of pre-alloyed bronze, a powder of partially alloyed bronze constituents which completely alloy during heating, or a mixture of copper and tin elemental powders which form bronze alloy when heated. The supporting body 1 on which the bronze powder was applied in this manner is pre-sintered at a preselected temperature effective to pre-sinter the bronze powder in a belt-type sintering furnace, also known as a strip-sintering or strand-sintering furnace.

After pre-sintering, the assembly is hot rolled under precisely guided temperature control, and subsequently given a final sintering at a temperature effective to sinter the materials. In this manner, a steel metal plate is made which has a defined porous bronze layer thereon.

Afterward, this assembly is placed in a container or housing under vacuum and the container is supplied with a suspension comprised of water, PTFE powder, and an emulsifying agent. The suspension is allowed to infiltrate the pores of the porous bronze layer for a time effective therefore, for example, for about 15 minutes, but the time may vary depending on factors including, by way of example, the pore size, the particle size, and the viscosity of the suspension. An infiltration time is selected which is sufficiently long to provide a preselected amount of PTFE in the pores of the sintered bronze layer. The suspension is then removed from the container, the sliding bearing material is removed and placed in a drying kiln at a temperature effective to dry the material, and is subsequently cold-densified by means of rolling using conventional temperature and pressure conditions. In this manner the PTFE material 3 is deposited in the pores of the sintered bronze layer and serves as the solid lubricant, preferably the sole solid lubricant. Moreover, only the PTFE serves as the solid lubricant.

Afterwards, the sliding bearing material may be further processed by metal-cutting and a sliding bearing with a wide range of different dimensions can be produced.

It will be understood that the above description of the present invention is susceptible to various modification, changes and adaptations, and the same are intended to be comprehended within the meaning and range of equivalence of the appended claims.

What is claimed is:

1. A method of making a multilayered sliding bearing material which is self-lubricating and maintenance-free, the method comprising the steps of:
   a. applying a layer of bronze powder onto a metallic supporting body, the bronze powder having different particle sizes, having a mean particle size of about 40 μm, and having a particle shape which is dendritic;
   b. sintering the layer of bronze powder onto the metallic supporting body in a furnace at a temperature of about 800° C. to provide a sintered layer of bronze having pores and to provide a sintered assembly;
   c. hot rolling the sintered assembly to provide the bronze layer with a porosity ranging from 40 to 70% throughout the entire thickness of the bronze layer;
   d. placing the sintered assembly in a container under a vacuum;
   e. supplying a suspension comprised of PTFE particles to the container for an infiltration period effective to secure infiltration of the PTFE particles into the pores of the sintered layer of bronze and provide a PTFE-impregnated bronze layer having a PTFE content of up to 20 weight %; and
   f. densifying the PTFE-impregnated bronze layer by means of rolling so that the PTFE-impregnated bronze layer has a sliding surface comprised of PTFE but no PTFE cover layer.

2. The method according to claim 1, wherein hot rolling takes place at a temperature of about 800° C.

3. The method according to claim 1, further comprising, after hot rolling, sintering the bronze layer by heating continuously at a temperature of about 800° C. and by maintaining the temperature for a period of time which is short.

4. The method according to claim 1, wherein the infiltration period is about 15 minutes.

5. The method according to claim 1, further comprising, after supplying the suspension and before densifying, removing the sintered assembly from the container and drying the sintered assembly in a kiln at a temperature ranging from about 40° C. to about 90° C.

6. The method according to claim 1, wherein the suspension is substantially comprised of water and PTFE particles having different particles sizes.

7. The method according to claim 1, wherein the bronze powder is comprised of from 80 to 95 weight percent of cooper and from 5 to 20 weight percent of tin.

8. The method according to claim 7, therein the bronze powder is comprised of 87 weight percent of cooper and 13 weight percent of tin.

9. The method according to claim 7, wherein the bronze powder further comprises at least one of aluminum, zinc, lead and magnesium.

10. The method according to claim 1, wherein the bronze layer has a thickness which ranges from about 0.5 to about 10 mm.

11. A method of making a multilayered sliding bearing material which is self-lubricating and maintenance-free, the method comprising the steps of:
   a. applying a layer of bronze powder onto a metallic supporting body, the bronze powder having different particle sizes, having a mean grain size of about 40 μm, and having a particle shape which is dendritic;
   b. pre-sintering the layer of bronze powder onto the metallic supporting body in a furnace at a temperature of about 800° C. to provide a pre-sintered layer of bronze having pores and to provide a pre-sintered assembly;
   c. hot rolling the pre-sintered assembly at a temperature of about 800° C. to provide the bronze layer with a porosity ranging from 40 to 70% throughout the entire thickness of the bronze layer;
   d. sintering the bronze layer by heating continuously at a temperature of about 800° C. and by maintaining the temperature for a period of time which is short;
   e. placing the sintered assembly in a container under a vacuum;
   f. supplying a suspension comprised of PTFE particles to the container for an infiltration period effective to secure infiltration of the PTFE particles into the pores of the sintered layer of bronze and provide an assembly including a PTFE-impregnated bronze layer having a PTFE content of up to 20 weight %;
   g. removing the assembly from the container;
   h. drying the assembly at a temperature effective therefore; and
   i. densifying the PTFE-impregnated bronze layer by means of cold-rolling so that the PTFE-impregnated bronze layer has a sliding surface comprised of PTFE but no PTFE cover layer.

* * * * *